455/3

[11] 3,569,617

[72] Inventors Murray W. Allen
Sydney, New South Wales (c/o School of Electrical Engineering, University of New South Wales, Baker Street Kensington, N.S.W. 2033);
Malcolm Macaulay, (12 Jackson Street, Campbell, A.C.T. 2601), Canberra;
Gordon A. Rose, Brisbae, Queensland, Australia (c/o Department of Computer Science, University of Queensland, St. Lucia, Brisbane, Qld. 4067)

[21] Appl. No. 812,752
[22] Filed Apr. 2, 1969
[45] Patented Mar. 9, 1971
[32] Priority Apr. 5, 1968
[33] Australia
[31] 36073/68

[54] GRAPHIC DISPLAY FACILITY FOR COMPUTING
1 Claim, 3 Drawing Figs.

[52] U.S. Cl. .......... 178/6, 178/6.8, 325/308, 340/324
[51] Int. Cl. .......... G09f 9/32, H04n 7/10, H04n 7/18
[50] Field of Search .......... 340/324.1; 178/6.8, 6 (PD); 325/308

[56] References Cited

UNITED STATES PATENTS

| | | | |
|---|---|---|---|
| 3,345,458 | 10/1967 | Cole | 340/324 |
| 3,366,731 | 1/1968 | Wallerstein | 325/308 |
| 3,394,366 | 7/1968 | Dye | 340/324 |

OTHER REFERENCES

Information Display, Jan.-Feb. 1968. " Magnetic Disc & TV Monitors = Low Cost Graphic Display Terminals." Copy in 340-324.1

*Primary Examiner*—James W. Moffitt
*Assistant Examiner*—Howard W. Britton
*Attorney*—McGlew and Toren

ABSTRACT: A graphic display facility for computing adapted to be connected to a computer wherein the input and output is effected and received by means of an ordinary television receiver used in connection with a light pen, there being a plurality of such television receivers and timing and synchronizing means in the system whereby each of the TV receivers may be used at will by a user to communicate with the computer.

Inventors
MURRAY WILLIAM ALLEN
MALCOLM MACAULAY
GORDON ALBERT ROSE
By McGlew and Toren
Attorneys Inventors
MURRAY WILLIAM ALLEN
MALCOLM MACAULY
GORDON ALBERT ROSE
By McGlew and Toren
Attorneys Inventors
MURRAY WILLIAM ALLEN
MALCOLM MACAULAY
GORDON ALBERT ROSE By [signature]
Attorneys

GRAPHIC DISPLAY FACILITY FOR COMPUTING

The present invention relates to a graphic display facility for computing which may be constructed in such a manner as to provide a relatively inexpensive means of giving multiple access to a computer to a number of users, to each of which a graphics console is available.

The distribution of large digital computer capability among numbers of users has been envisioned and predicted for some years. A group of engineers and scientists at the Massachusetts Institute of Technology has designed and operated a system called "Project MAC". The experience with the Project MAC system although limited to 160 stations and 30 simultaneous users, has gathered important experimental evidence to aid in understanding the operation of a computing utility for more general public service. One of the major difficulties of a practical computing utility has been the lack of inexpensive generally useful input/output terminals and an appropriate two-way communication linkage. The MAC system employs Teletypewriters as input/output terminals and commercial Teletype circuits for communication. Although serviceable, such a system lacks generally and is quite expensive for public use. The method and apparatus for computer utility use herein disclosed employs inexpensive standard commercial television receivers as terminals and a TV cable distribution system for both input and output data. Not only is an enhanced output capability provided by the TV display (e.g., graphs and figures are much more easily shown than by Teletype) and a more flexible input capability provided (i.e., no restrictions are imposed on the user by keyboard limitations) but the terminal cost is lower. This useful result may be achieved in a system constructed in accordance with the present invention.

The invention consists in a graphic display facility for computing consisting of a data interpreter display generator adapted to be connected to a digital computer, a scan converter connected to the output of said date interpreter display generator, a video signal distributor connected to the output of said scan converter, a multichannel video disc recorder connected to said video signal distributor whereby output from the computer is fed to a predetermined track of said video disc recorder on instructions from the computer, a multichannel TV transmitter connected to the output of said video disc recorder each channel corresponding to a track of said video disc recorder, a plurality of television receivers connected by a single coaxial cable to said transmitter, a light pen or like light-detecting means associated with each television receiver, means to develop a coded signal representative of the physical position on the face of the television receiver detected by each said light pen or like light-detecting means, modulated radio frequency signalling means connected by said coaxial cable to signal-detecting and decoding means arranged to relay said coded signal to the data interpreter display generator, timing and synchronizing means responsive to timing pulses produced by said video disc recorder arranged to maintain synchronism and correct timing in the system, the arrangement being such that each of said TV receivers may be used at will by a user to communicate with the computer.

In order that the nature of the invention may be better understood a preferred form thereof is hereinafter described, by way of example, with reference to the accompanying drawings in which.

Figure 1:
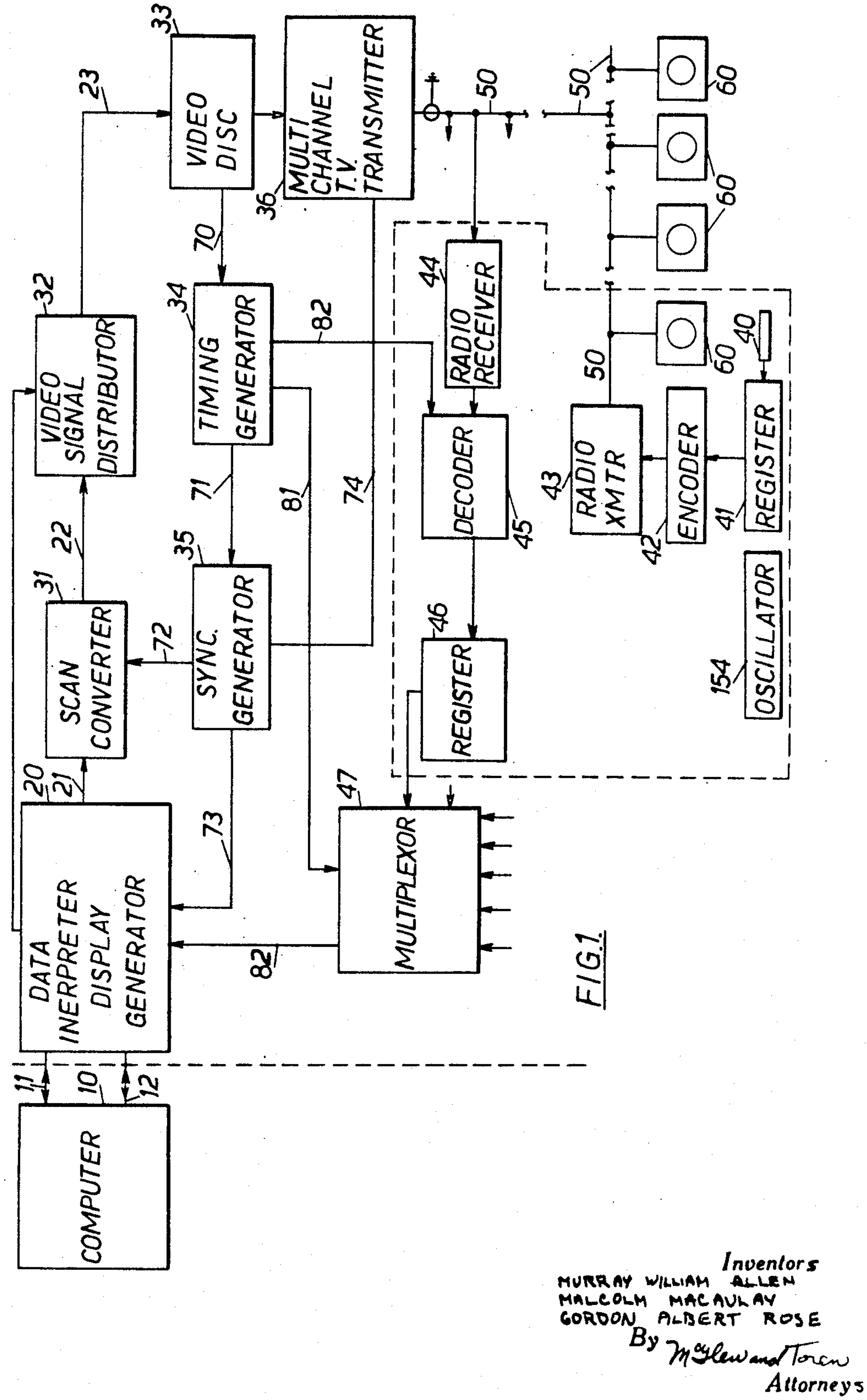
FIG. 1 is a block circuit diagram of a facility in accordance with the invention.

A limitation of the system herein disclosed is that TV cable distribution is not presently economically attractive over large areas, restricting practical application to those users within a small geographic community such as a university campus. Further, a limit to the number of simultaneous users is set by the number of standard television channels.

A digital computer system has been generally designated by numeral 10 with communication cables for data 11 and control 12. Although not restricted to a specific computer, in fact any currently manufactured general purpose digital computer will do, an IBM model 360/50 computer is to be used. Data from the computer is transmitted on cable 11 to the data interpreter/display generator shown as element 20. Data from the date interpreter/display generator is transmitted on cable 11 to the computer. Signals to control the exchange of data between the computer and the data interpreter/display generator are communicated on cable 12. As is readily apparent the exchange of data and control signals is specific to the computer used, although the general character of the circuit and circuit conventions is not dissimilar from computer to computer. Data interpreter/display generator, 20, converts the digital data from the computer into scan converter control signals, the result being to make electrical signals to generate images which may be communicated in electrical form by a conventional television system. A data interpreter/display generator has been rather fully described in the publication "Economical, Graphical Communication Techniques for Multiple Console Operation" Gordon A. Rose, Third Australian Computer Conference Proceedings, May 1966.

The electrical output on cable 21 from data interpreter/display generator 20 determines the instantaneous vertical position of the picture element, the instantaneous horizontal position of the picture element and the instantaneous position of the picture element and the instantaneous luminance of the picture. Scan converter 31 may be constructed in several ways, the more conventional being to use a scan conversion tube such as the Raytheon CK7702 or the combination of cathode ray tube, lens and Vidicon, Orthicon or Plumbicon. Whatever technique is used, the result is the conversion of picture elements randomly position generated to picture elements cyclically generated in the conventional TV manner. For reasons that will become clear as the description progresses, the TV scanning control signals are provided from sync generator 35 that is initiated by timing generator 34 from signals recorded on video disc 33. The video signal from scan converter 31 is carried on wire 22 to video signal distributor 32.

Control signals from the data interpreter/display generator 20 select which of the wires in cable 23 is to carry the converted signal to video disc 33 for recording. Thirteen tracks are provided on video disc 33, one for each Australian standard television channel (channel 0 —11 and 5*a*). There is a track on video disc 33 for each TV channel of Multichannel TV transmitter 36. In this manner, the control signals from data interpreter/display generator 20 determine the channel within which a TV message will be transmitted on cable 50 to conventional TV receivers 60, the signal path being from scan converter 31 via video signal distributor 32 to the selected track on video disc 33 and thence to a specific channel modulator of multichannel TV transmitter 36. Control of the timing of the system arises from data recorded on a track of the video disc, to assure that synchronism of both computer elements and television elements is maintained in the presence of minor irregularities in the rotational velocity of the video disc.

A basic timing signal permanently recorded on video disc 33 is scaled and distributed by timing generator 34. Wire 71 carries appropriate signals to synch generator 35 to initiate both horizontal and vertical scansion of the TV components. The voltages on lines 72 and 74 are TV "Composite synch" signals. The voltage on line 73 is the TV vertical blanking signal. Other pulses are distributed on lines 81 and 82 from timing generator 34. The function of these signals will be discussed later in this specification.

Having described apparatus for constructing a TV picture from computer data and the interconnection of means to store and distribute the data to several users, the complementary apparatus for constructing digital data from a TV picture, storing it and transmitting it to a computer will now be described.

Figure 2:
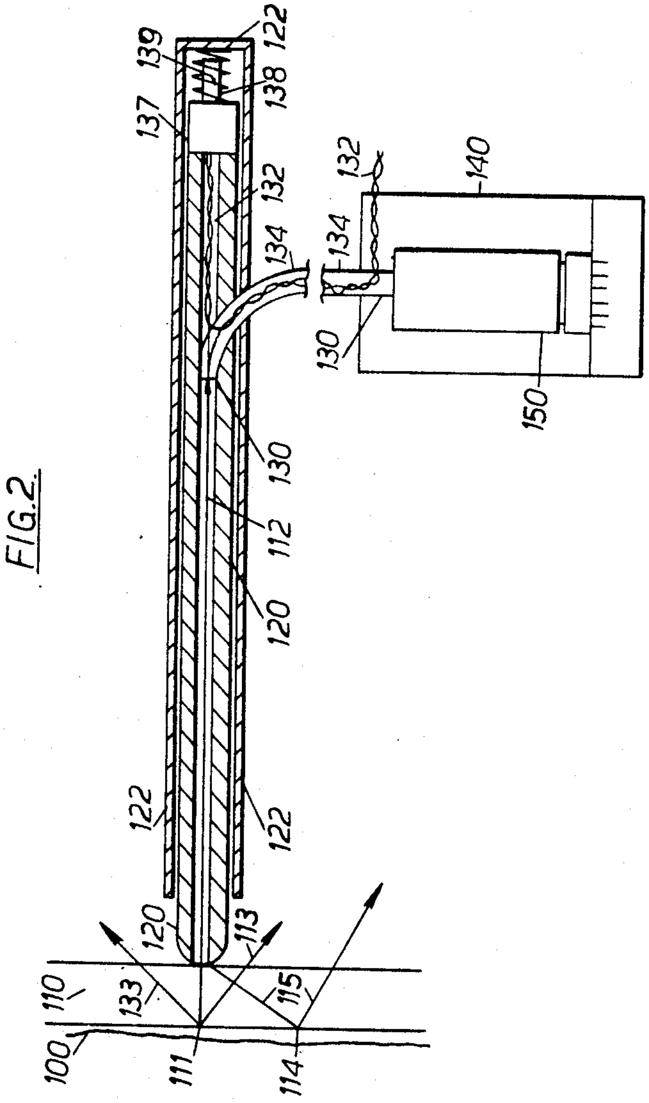
FIG. 2 is a diagrammatic sectional view of a light pen for use in the facility.

FIG. 2 shows a device dubbed a "lensless light pen" generally useful for sensing the position of the scanning electronic beam of a cathode ray tube by responding to the light emitted as the beam excites the CRT phosphor at the point within the light acceptance area of the pen.

The pen comprises a tubular member 120 with an interior nonreflective bore 125 terminating at a fibre optic cable bundle 130. The cathode ray tube phosphor 100, lies behind a glass envelope 110. Light will be emitted by a phosphor element such as 111 or 114 when the cathode ray beam strikes. Light from point 114 will be scattered in all directions such as 115, but no light will enter bore 125 at such an angle as to strike the end of fibre optic bundle 130. Light from point 111, in direct alignment with bore 125 will scatter in all directions such as 113 and 112. However, ray 112 will pass directly down the bore 125 to strike the ends of fibre optic bundle 130. The nonreflective bore provides a lenslike action.

Light is conducted by fibre optic bundle 130 in cable 134 to lighttight housing 140 containing photomultiplier tube 150. As will be explained subsequently, the electrical pulse developed by photomultiplier tube in response to light emitted by CRT phosphor element 111 will be used as a data-encoding signal. Surrounding light pen barrel 120 is a pipelike shroud 122. The shroud is somewhat longer than the pen barrel. A small electrical switch 137 activated by plunger 138 is mounted on the end of light pen barrel 120 between the barrel and the closed end of the shroud. A spring 139 holds the shroud and barrel apart so that the switch is not actuated until the user presses the light pen against the CRT faceplate. Wires 132 contained in cable 134 carry the electrical circuit to switch 137.

Figure 3:
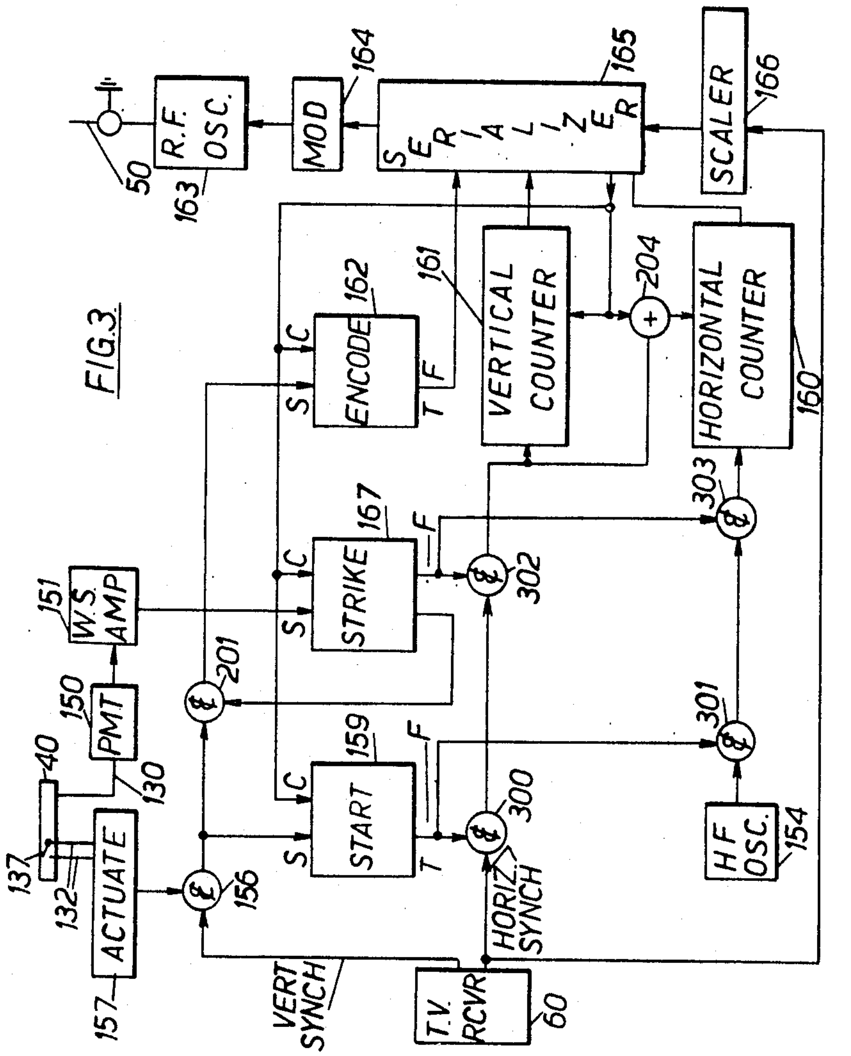
FIG. 3 is a circuit diagram showing apparatus associated with the operation of the light pen.

FIG. 3 is a block diagram showing how the light pen output signal is used to control circuits that assemble digital data indicative of light pen position and transmit that data via cable 50. Actuating light pen switch 137 closes a circuit via wires 132 to actuator logic 157. When this circuit is thus closed, actuator logic 157 provides a voltage level representative of logical one to AND gate 156. A vertical sync pulse subsequently issued from the sync separator of the television receiver 60 will pass through AND gate 156 setting start flip-flop 159 which then enables AND gates 300 and 301. Thereafter, horizontal sync pulses from the sync separator of television receiver 60 will pass through both AND gates 300 and 302 to advance vertical counter 161 and through OR gate 204 to clear horizontal counter 160. In like fashion output pulses from high frequency oscillator 154 will pass through both AND gates 301 and 303 to advance horizontal counter 160.

Light from the CRT screen of television receiver 60 striking light pen 40 will be relayed to photomultiplier 150. The output signal from the photomultiplier will be amplified and shaped by circuit 151 thence employed to set the strike control flip-flop 167. The set condition of strike flip-flop 167 will stop further advance of the horizontal and vertical counters by disabling AND gates 302 and 303, thus inhibiting the passage of further horizontal sync pulses to the vertical counter and the passage of further high frequency oscillator pulses to the horizontal counter. After the strike flip-flop is set, the vertical sync pulse next in sequence combined with the actuator logic signal will be passed to encode flip-flop 162 via AND gate 201 to initiate count serializing action. Clocking signals derived by scaler 166 from the horizontal sync pulses of TV receiver 60 will control the timing of vertical and horizontal count serialization by serializer 165. The vertical and horizontal count information is thence dispatched via modulator 164 and RF oscillator 163 to coaxial cable 50. At the completion of transmission a pulse issued from serializer 165 clears vertical counter 161, horizontal counter 160, and resets start flip-flop 159, encode flip-flop 162 and strike flip-flop 167.

At the termination of coaxial cable 50 a conventional radio receiver 44 is used to detect the encoded counts.

FIG. 1 shows that a decoder 45 timed from generator 34 by pulses on line 82 presents the data in parallel form at register 46. In a multichannel system there are many resistors 46, decoders 45 and receivers 44, one for each active TV channel to be used. Deriving its timing from generator 34 by pulses on line 81, multiplexer 47 samples the contents of each register 46 in turn, passing the data on line 82 to data interpreter/display generator 20 for action. As readily apparent to one conversant with the art of CRT display and light pen use therewith, light pen coordinate data may be employed to "-draw" graphs, curves, engineering drawings or the like as well as to "pick" certain designated screen areas simulating a typewriter or adding machine keyboard.

The embodiment of the invention described above provides a facility which enables a number of users up to a maximum of the number of channels available on a standard TV receiver to make use of the computer simultaneously. This embodiment is described by way of example as constituting one particular construction within the scope of the invention as defined broadly above.

We claim:

1. A graphic display facility for computing consisting of a data interpreter display generator adapted to be connected to a digital computer, a scan converter connected to the output of said data interpreter display generator, a video signal distributor connected to the output of said scan converter, a multichannel video disc recorder connected to said video signal distributor whereby output from the computer is fed to a predetermined track of said video disc recorder on instructions from the computer, a multichannel TV transmitter connected to the output of said video disc recorder each channel corresponding to a track of said video disc recorder, a plurality of television receivers connected by a single coaxial cable to said transmitter, a light pen or like light-detecting means associated with each television receiver, mears to develop a coded signal representative of the physical position on the face of the television receiver detected by each said light pen or like light-detecting means, modulated radio frequency signalling means connected by said coaxial cable to signal detecting and decoding means arranged to relay said coded signal to the data interpreter display generator, timing and synchronizing means responsive to timing pulses produced by said video disc recorder arranged to maintain synchronism and correct timing in the system, the arrangement being such that each of said TV receivers may be used at will by a user to communicate with the computer.